June 3, 1930.  F. F. QUICKERT  1,761,679
VELOCIPEDE
Filed Sept. 18, 1928
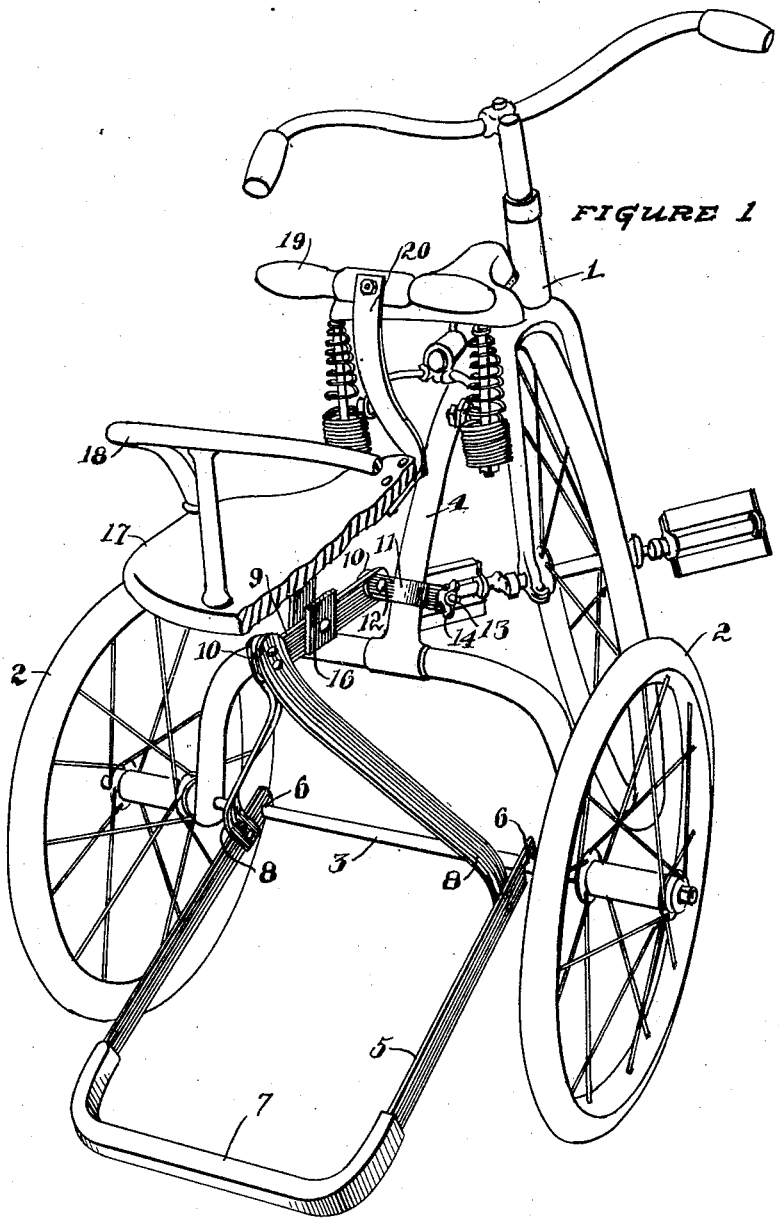
FIGURE 1
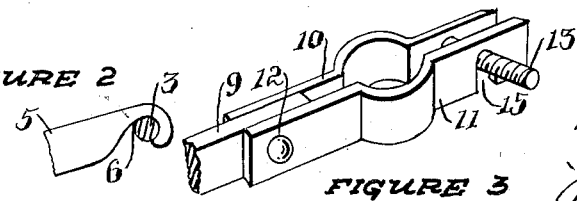
FIGURE 2
FIGURE 3
INVENTOR
Fred F. Quickert
John A. Naismith
ATTORNEY Patented June 3, 1930

1,761,679

UNITED STATES PATENT OFFICE

FRED F. QUICKERT, OF GILROY, CALIFORNIA

VELOCIPEDE

Application filed September 18, 1928. Serial No. 306,716.

It is the object of the invention to provide a means whereby the common form of velocipede capable of carrying one person may be readily converted into a tandem vehicle without alteration to the original structure.

It is another object of the invention to provide a means of the character indicated mountable upon the rear of a velocipede and provided with means that will effectually prevent upsetting of the velocipede through accidental unbalancing thereof.

It is also an object of the invention to provide a means of the character indicated that may be quickly and easily mounted upon and removed from velocipedes of varying design.

It is still another object of the invention to provide a means of the character indicated that will be economical to manufacture, simple in form and construction, of few parts, strong, durable, and highly efficient in its practical application.

In the drawing:

Figure 1 is a perspective view of a velocipede embodying my invention, part broken away.

Figure 2 is a detail elevation of a portion of the supporting means of the tandem seat.

Figure 3 is a perspective illustration of a portion of the means for clamping the tandem seat support on the velocipede.

Referring now more particularly to the drawing, I show at 1 a velocipede including two rear wheels 2 mounted upon a rear axle 3, the axle 3 supporting a forked frame portion 4.

The structure embodying my invention comprises a U shaped member 5 having notches as 6 formed in the two ends in such a manner as to form hooks engageable with the axle 3 of the velocipede as shown. This member is fitted with a rubber bumper element as shown at 7.

Mounted on the member 5 adjacent the notches 6 are a pair of upstanding and converging arms 8 which rigidly support a bar 9 through the medium of rivets 10, the bar extending forwardly of the arms 8 to a point adjacent the fork 4 when the device is in position on the velocipede.

Pivotally mounted on the forward end of the bar 9 are clamp members 10 and 11, the pivot being indicated at 12. These clamp members are adapted to pass on either side of the fork bar 4 and rigidly grasp the same when brought together by means of the bolt 13 and wing nut 14. The clamp member 11 is provided with a slot at 15 to permit disengagement from the bolt without entirely removing the nut 14.

A seat is mounted on the bar 9 in any suitable manner as 16, the seat being shown at 17 and provided with a back 18 and handle 19. The handle is mounted on the forward end of the seat by means of a bar 20.

When this attachment is formed and assembled as described it is only necessary to drop the notches 6 into engagement with the axle 3 and then secure the clamp 10—11 on to fork 4 to prepare it for use. Since the upstanding arms 8 are substantially at right angles to the member 5, and the bar 9 is substantially at right angles to the arms 8 it follows that when the device is mounted and clamped in position as set forth the bumper end 7 of member 5 is normally held a distance above the surface over which the vehicle moves. If, however, the child on seat 17 moves in such a manner as to overbalance the velocipede, then the bumper end 7 contacts with the ground or floor and effectually prevents the vehicle from moving backwardly. It functions as an automatic brake that becomes operative only when the velocipede is over balanced backwardly.

In the present instance the clamp members are pivoted on the bar 9 so they may be readily moved into any desired angle found necessary to engage the center bar of the fork 4, the position of this bar varying in different types of velocipedes. If the end of the bolt 13 is enlarged to prevent the nut 14 from being worked off the clamp may be removed by loosening the nut and then swinging the clamp member 11 free of the bolt.

When the device is in position and the clamp tightened up it is perfectly rigid throughout. The velocipede and the tandem seat structure may be lifted as a unit without effecting any relative movement between the two parts. This is due, of course, to the fact that the arms 8 are connected to the member 5 a distance back from its ends so that an upward force applied to the arms or member 5 exerts a pulling force on the notched ends 6 and tends to urge them into more intimate engagement with the axle. Likewise a downward pressure on these parts, such as when a child is mounted on seat 17, also exerts a pulling force on the parts engaging the axle, the greater the weight the greater and more positive the engagement.

It is to be understood, of course, that while I have herein shown and described but one specific embodiment of the invention, changes in form, construction, and method of assembly and operation may be made within the scope of the appended claims.

I claim:

1. An attachment for velocipedes, comprising a member mountable upon the rear portion of a velocipede to extend rearwardly therefrom, upstanding supporting means mounted on said member, a member mounted on said means and extending forwardly thereof, and means mounted on said last member adapted to engage a velocipede frame.

2. An attachment for velocipedes, comprising a member mountable upon the rear portion of a velocipede to extend rearwardly therefrom, upstanding supporting means mounted on said member, a member mounted on said means and extending forwardly thereof, and means pivotally mounted on the forward end of said last member and adapted to engage a velocipede frame.

3. An attachment for velocipedes, comprising a U shaped member adapted to engage a velocipede frame at its free ends, and means for supporting the member in a fixed position relative to the velocipede frame, said means comprising a bracket mounted on the member adjacent its free ends, a bar mounted on the bracket, and fastening means mounted on the bar and engageable with the velocipede frame.

4. An attachment for velocipedes, comprising a U shaped member having means formed in its free ends adapted to engage the rear axle of a velocipede, an upstanding bracket mounted on said member adjacent said free ends, a forwardly extending bar mounted on said bracket, and clamp means mounted on the forward end of the bar and adapted to engage the velocipede frame.

5. An attachment for velocipedes, comprising a member having spaced means thereon adapted to engage the velocipede frame adjacent its wheels, said member extending a distance rearwardly of the frame, and means for supporting the member in a fixed position relative to the frame, said means comprising an upstanding bracket mounted on the member at points adjacent its points of attachment to the frame, a forwardly extending bar mounted on the bracket, and clamping means pivotally mounted on the forward end of the bar and adapted to engage the velocipede frame.

6. An attachment for velocipedes comprising, a member mountable upon the rear axle of a velocipede and extending rearwardly and downwardly therefrom to form a bumper, upstanding supporting means mounted on the member adjacent its connection to the axle, and means mounted upon the upper end of the supporting means adapted to engage a velocipede frame and normally support the bumper in spaced relation to the ground over which the velocipede moves.

7. An attachment for velocipedes comprising, a member mountable upon the rear axle of a velocipede to extend rearwardly and downwardly therefrom to form a bumper, supporting means mounted thereon adjacent its connection to the axle, a forwardly directed bar rigidly connected to the supporting means, a seat mounted thereon, and a frame engaging clamp pivotally mounted on the forward end of the bar.

FRED F. QUICKERT.